(No Model.)

D. A. STREETER.
APPARATUS FOR PLACING HYDRAULIC AND OTHER PIPE IN TRENCHES.

No. 388,598. Patented Aug. 28, 1888.

Witnesses,
J. H. Shumway
Fred. C. Earle

Daniel A. Streeter,
Inventor.
By Atty,
John C. Earl.

UNITED STATES PATENT OFFICE.

DANIEL A. STREETER, OF WATERBURY, CONNECTICUT.

APPARATUS FOR PLACING HYDRAULIC AND OTHER PIPES IN TRENCHES.

SPECIFICATION forming part of Letters Patent No. 388,598, dated August 28, 1888.

Application filed April 23, 1888. Serial No. 271,552. (No model.)

*To all whom it may concern:*

Be it known that I, DANIEL A. STREETER, of Waterbury, in the county of New Haven and State of Connecticut, have invented a new Improvement in Apparatus for Placing Hydraulic and other Pipes in Trenches; and I do hereby declare the following, when taken in connection with accompanying drawings and the letters of reference marked thereon, to be a full, clear, and exact description of the same, and which said drawings constitute part of this specification, and represent, in—

Figure 1:
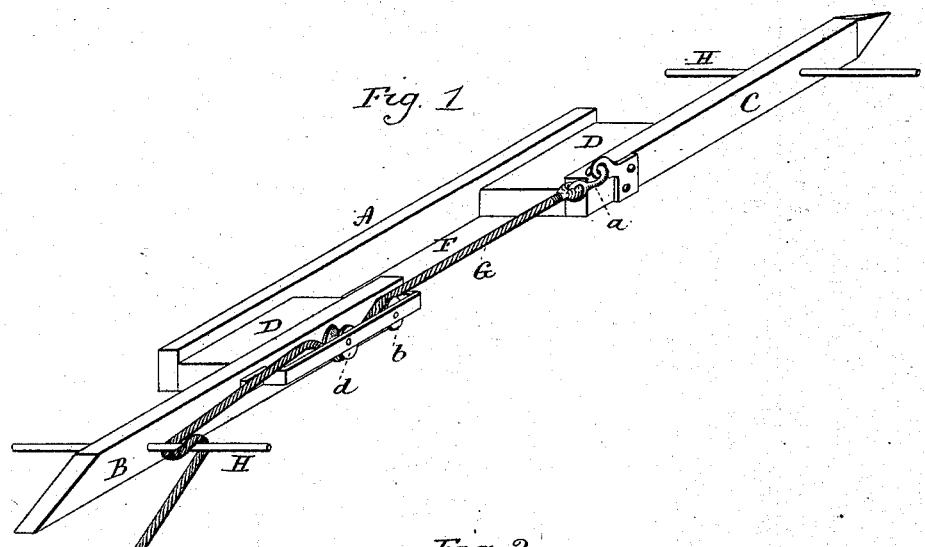
Figure 2:
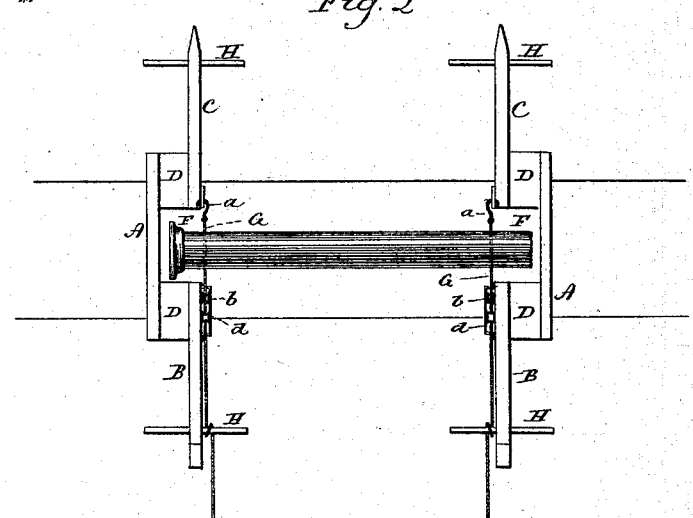
Figure 3:
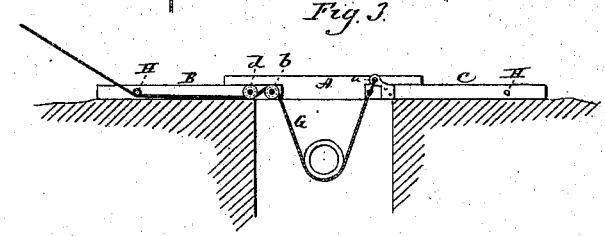

Figure 1, a perspective view of one of the pair of devices complete; Fig. 2, a top or plan view showing the beams as arranged over a trench and as in the operation of handling a pipe; Fig. 3, a transverse section through a trench, showing the pipe as being lowered.

The object of my invention is to provide a simple apparatus which may be easily removed, manipulated by few hands, and so that the pipe will be under perfect control during its introduction; and it consists in the construction hereinafter described, and as more particularly recited in the claims.

The apparatus consists of a pair of beams of a length greater than the width of the trench and so as to extend across the trench and rest upon each side distant from each other according to the length of the pipe to be lowered, as represented in Fig. 2. These beams are best made from wood, A representing a piece of timber of sufficient strength and of a length greater than the width of the trench, with two arms, B C, parallel with said timber A and connected to the said timber by means of blocks D D, the said arms extending inward from each side, but so as to leave a recess, F, between them of a width greater than the diameter of the pipe to be laid. Two such beams are employed for each pipe, one right hand and the other left, as represented in Fig. 2, and so that the recesses may both stand over the trench in line with each other, and the opening of the recess of one beam toward the opening of the recess of the other, as represented in Fig. 2.

To the inner end of one of the arms C, or at other convenient point, provision is made for the attachment of one end of a rope, G. (Here represented as by a hook and eye, *a*.) Upon the other arm one or more pulleys, *b d*, are hung upon horizontal axes, the plane of the pulley being parallel with the plane of the respective arms, and so that the rope G, attached by one end to the beam at one side of the trench, extends across and over the pulley *b*, and there interlaced with other pulleys, if they are employed, permits the rope to run across the recess F, and, as seen in Fig. 2, one rope at each beam.

The two parts of the apparatus are arranged distant from each other less than the length of the pipe to be laid, but so that the opposite recesses will leave an opening into the trench through the beams greater in length than the length of the pipe to be laid, and as represented in Fig. 2. Thus in place, the pipe is rolled upon the arms B B, which serve as skids to conduct the pipe to the respective recesses. The pipe, arriving at the recesses, passes onto the ropes G, a man holding the free end of each rope. Then each rope is slackened, working over the respective pulleys, the two ends of the pipe passing down through the recesses F F to the position in the trench, the trenchmen guiding it to its place.

The arms B C are each provided with a transverse bar, H, at the outer end. The said bars on one side serve as convenient means for applying friction to the rope. The rope being wound around the bar, as represented, and so as to slip thereon as the pipe is lowered, produces friction, so that a single man at each end of the rope may be able to work the respective ropes. The bars H also serve as convenient handles for transporting the apparatus. These lowering devices occupy but a small space upon each side of the trench, and lying, as they do, flat upon the surface their support is firm and strong, thereby avoiding the use of guys. Again, the lowering devices are of light weight compared to the usual derricks, so that two men may readily transfer them from place to place, as occasion requires, for lowering successive lengths of pipe. After a pipe has been laid the rope may be detached from its hook-connection and drawn around the pipe and up upon the other side, to be reattached for the lowering of the next length.

The cost of the apparatus is very slight compared to a derrick of equal power and capacity, and the saving of labor in the use of this apparatus over that of a derrick is very great, and not only is there such a saving of labor, but the work is performed much more quickly than can be done in a derrick, owing to the readiness with which the pipe may be placed in position for lowering and the lowering devices transferred.

It will be understood that this apparatus may be employed for lifting pipes from trenches by simply reversing the operation.

I claim—

1. The herein-described apparatus for placing pipes in trenches, consisting of a pair of beams adapted to extend across the trench and rest upon each side, the said beams upon their adjacent faces each constructed with a recess, F, combined with ropes G, attached by one end upon one side of each recess and extending across the recess, and one or more pulleys on each beam upon the side of the recess opposite to which the rope is attached, the ropes working upon said pulleys, substantially as described.

2. The combination of a pair of beams adapted to extend across the trench into which the pipe is to be placed, the beams each constructed with a recess, F, upon their adjacent faces, each beam constructed with longitudinally-projecting arms B C at its respective ends, the said arms provided with transverse bars H, pulleys on each beam at one side of the said recess, and ropes G, attached by one end to the other side of said recesses and extending across said recesses and over said pulleys, substantially as and for the purpose described.

DANIEL A. STREETER.

Witnesses:
NELSON J. WELTON,
WM. W. BONNETT.